(12) United States Patent
Rainer et al.

(10) Patent No.: US 11,795,888 B2
(45) Date of Patent: Oct. 24, 2023

(54) METHOD FOR CALIBRATING A TECHNICAL SYSTEM

(71) Applicant: AVL LIST GMBH, Graz (AT)

(72) Inventors: Andreas Rainer, Maria Rojach (AT); Nico Didcock, Graz (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 17/254,755

(22) PCT Filed: Jun. 21, 2019

(86) PCT No.: PCT/EP2019/025193
§ 371 (c)(1),
(2) Date: Dec. 21, 2020

(87) PCT Pub. No.: WO2019/242892
PCT Pub. Date: Dec. 26, 2019

(65) Prior Publication Data
US 2021/0254572 A1  Aug. 19, 2021

(30) Foreign Application Priority Data

Jun. 21, 2018  (AT) .............................. A 50499/2018

(51) Int. Cl.
*F02D 41/24* (2006.01)
*F02D 41/14* (2006.01)
(Continued)

(52) U.S. Cl.
CPC ..... *F02D 41/2432* (2013.01); *F02D 41/1406* (2013.01); *F02D 41/26* (2013.01); *G05B 13/024* (2013.01); *G06F 17/11* (2013.01)

(58) Field of Classification Search
CPC ... F02D 41/1406; F02D 41/2429–2432; F02D 41/26; G05B 13/024; G06F 17/11;
(Continued)

(56) References Cited

U.S. PATENT DOCUMENTS

2005/0273242 A1  12/2005  Kruse et al.
2014/0344320 A1  11/2014  Wallner et al.
(Continued)

FOREIGN PATENT DOCUMENTS

JP  2009151383 A  7/2009
JP  2013218725 A  10/2013
(Continued)

OTHER PUBLICATIONS

H. Edelsbrunner, et al., "Three-Dimensional Alpha Shapes," ACM Transactions on Graphics, vol. 13, No. 1, Jan. 1994, pp. 43-72.

*Primary Examiner* — Scott A Reinbold
(74) *Attorney, Agent, or Firm* — Dykema Gossett PLLC

(57) ABSTRACT

Various aspects of the present disclosure are directed to, for example, a method for calculating a data envelope while calibrating a technical system. In some specific embodiments, the d-dimensional calibration space, which comprises the calibration variables required for the calibration, is divided into a first sub-calibration space having a dimension $d_{sub}<d$ and at least one further sub-calibration space, and a $d_{sub}$-dimensional data envelope is calculated at least for the first sub-calibration space using available data points and is checked during the calibration as an auxiliary condition.

7 Claims, 4 Drawing Sheets

(51) Int. Cl.
   *F02D 41/26* (2006.01)
   *G05B 13/02* (2006.01)
   *G06F 17/11* (2006.01)

(58) Field of Classification Search
   CPC ... G07C 5/0808; G07C 5/0816; B60T 17/221; E02F 9/267
   USPC ...................................... 701/33.1, 33.8, 33.9
   See application file for complete search history.

(56) References Cited

U.S. PATENT DOCUMENTS

| | | |
|---|---|---|
| 2016/0063151 A1 | 3/2016 | Stadlbauer et al. |
| 2018/0259916 A1 | 9/2018 | Fischer et al. |

FOREIGN PATENT DOCUMENTS

| | | | | |
|---|---|---|---|---|
| WO | WO-2013087307 A2 | * | 6/2013 | ......... F02D 41/1406 |
| WO | WO-2014187828 A1 | * | 11/2014 | ........... G05B 13/041 |
| WO | 2017061028 A1 | | 4/2017 | |
| WO | 2017198638 A1 | | 11/2017 | |

* cited by examiner

METHOD FOR CALIBRATING A TECHNICAL SYSTEM

CROSS-REFERENCE TO RELATED APPLICATIONS

This application is a national stage filing based upon International PCT Application No. PCT/EP2019/025193, filed 21 Jun. 2019, which claims the benefit of priority to Austria application No. A 50499/2018, filed 21 Jun. 2018.

BACKGROUND

The present invention relates to a method for calibrating a technical system that is controlled by a number of control variables of the technical system and, in dependence of the control variables of the technical system, an operating point results in the form of a number of state variables of the technical system, wherein with the calibration in an i-th operating point, the control variables of the technical system, which are optimal with regard to at least one output variable of the technical system, are searched by means of an optimization while observing given auxiliary conditions, wherein, with an auxiliary condition of the optimization, it is checked whether a test point with control variables of the technical system and calculated during the optimization lies within a data envelope around a number of existing data points of the technical system.

When calibrating an internal combustion engine, it is generally a matter of defining specific predetermined control variables of the internal combustion engine in dependence of state variables of the internal combustion engine such that specific specifications, such as emission limits or consumption limits (output variables, in general), are observed and impermissible operating states of the internal combustion engine are avoided. Control variables are generally variables that adjust or control the internal combustion engine, for example, an ignition time, an injection time (e.g., pre-injection, post-injection), the amount of recirculated exhaust gas of an EGR (exhaust gas recirculation), the position of a throttle valve, etc. State variables are variables of the internal combustion engine that follow in dependence of the control variables and in dependence of current external influences (such as a load, ambient conditions (e.g., ambient temperature, atmospheric pressure), etc.). Typical state variables of an internal combustion engine are speed and torque. The state variables describe an operating state of the internal combustion engine. The state variables can be measured, but they can also be calculated from other measured variables of the internal combustion engine, e.g., by means of models. The control variables and the state variables together form the input variables of the calibration in the form of an input variable vector of all control variables and state variables. Impermissible operating states are determined, e.g., on the basis of physically measurable output variables, such as consumption, emission (NOx, COx, soot, etc.), cylinder pressure, engine temperature, etc. For this purpose, corresponding limit values of the measurable output variables are usually specified. The output variables result from the current operating status (state variables) and the current control variables as a reaction of the internal combustion engine. Specific state variables can also be limited, for example, a maximum torque or a maximum speed, and thus define an impermissible operating state. However, an impermissible operating state of the internal combustion engine can also manifest itself in undesirable effects such as knocking, misfiring, etc. Hence, said impermissible operating states occur with certain combinations of input variables, possibly also on the basis of external influences. When calibrating an internal combustion engine, it is important to determine the control variables for given state variables, and possibly also for specific external influences, such that, if possible, no impermissible operating states occur and, at the same time, specific output variables (objectives of the calibration) are optimized (usually minimized), typically emission values (NOx, COx, HC (hydrocarbon) proportion in the exhaust gas, soot, fine dust, etc.) and consumption. In calibration, the testing space is the multi-dimensional (according to the number of control variables) space that is spanned by the control variables. All permissible control variables of the testing space form the drivable area, within which the control variables for given state variables must lie in order to not cause any impermissible operating states. The drivable area, which depends on the current state variables, is thus a subspace of the testing space. The outer boundary of the drivable area is frequently also called the drivability limit.

The control variables are often stored in control units, for example, as characteristic maps in dependence of the state variables. For an internal combustion engine, the control variables are stored, e.g., in an engine control unit, for a transmission, e.g., in a transmission control unit, for a hybrid drive train, e.g., in a hybrid control unit, and so on.

Today's internal combustion engines have a multiplicity of control variables which are set in dependence of a multiplicity of state variables. Due to the resulting multiplicity of input variables of the calibration, the usually non-linear influences of the control variables on the operating states of the internal combustion engine, and also due to the, also multiple, interdependencies of the input variables (because the drivability limit must be observed), calibration is a very complex task which can hardly be accomplished manually. The calibration is therefore often solved as an optimization problem, wherein the, or specific, input variables are optimized (minimized or maximized) with regard to one or more output variables. During the optimization, the control variables are varied for predetermined state variables and possibly also for given external influences in order to optimize the output variables. When calibrating an internal combustion engine, emission values or consumption are often used as the output variable. Auxiliary conditions are also specified for the optimization, particularly also the observance of the drivability limit. This means that during the optimization, only such control variables and state variables are allowed that lie within the drivability limit. In this way, characteristic maps are usually created for the control variables in dependence of the state variables, and possibly also in dependence of external influences, which are stored in the engine control unit of the internal combustion engine for controlling the internal combustion engine. In driving mode, the current state variables are detected and the adjustments to be carried out for the control variables are taken from the stored characteristic maps and adjusted on the internal combustion engine.

One problem hereby is that only a limited, discrete number of data points of the input variables is available for the calibration (in this case, a data point is a specific input variable vector). Said data points are either calculated from models or measured on a test stand on the actually available and operated internal combustion engine. However, a drivability limit is not yet available. Whether a control variable newly determined from the optimization for specific state variables, in most cases a control variable vector with several control variables, lies within or outside the drivability limit cannot be determined on the basis of the available discrete data points. For this reason, so-called data envelopes have already been used, which calculate an envelope for the data points, the so-called data envelope, from a limited number of data points. The drivability limit is thus formed by the data envelope.

In order to solve this problem, envelope algorithms have already become known which calculate the data envelopes exclusively from the available permissible data points. One example hereto is the convex data envelope, which is defined as the smallest convex space that contains the available data points. A well-known algorithm that approximates a convex data envelope is the so-called QuickHull algorithm. However, the use of the convex data envelope is problematic for two reasons. First, the calculation of the convex envelope is only efficient in low-dimensional testing spaces. However, the calculation effort increases exponentially with the dimension of the testing space, but also with the number of data points for the calculation of the data envelope, so that a calculation from approximately 10-dimensional testing spaces with a reasonable calculation effort is already practically impossible. Second, the relevant areas of the testing space are often not convex in practice, which leads to unrealistic data envelopes. This problem is frequently solved by more complex triangulations. Triangulation refers to the division of the convex data envelope into simple shapes, i.e., in the two-dimensional case, for example, the triangulation of the data points into triangular networks. An example of non-convex triangulations are the so-called alpha shapes, described, for example, in H. Edelsbrunner, et al., "Three-Dimensional Alpha Shapes," ACM Transactions on Graphics, Vol. 13, No. 1, January 1994, pages 43-72. However, the calculation of these triangulations is also very complex and time-consuming for higher dimensions and also for a large number of data points.

Especially when calibrating an internal combustion engine, 10 to 20 and more control variables (dimension of the testing space >10) must usually be processed. $10^5$ to $10^6$ available data points for the calibration are also not uncommon. Both of these factors make it practically impossible to calculate a convex data envelope during calibration, at least with a reasonable effort and in a reasonable time.

Envelope algorithms are known from WO 2017/198638 A1, with which data envelopes can be calculated with reasonable effort even with large dimensions of the testing space, particularly also >10. However, these algorithms are often not implemented in the calibration environments used and therefore cannot be used. Apart from that, calibration engineers frequently rely on familiar algorithms, especially the convex data envelope, instead of trying new things.

Therefore, despite the available alternatives, the testing space is frequently reduced manually in order to calculate convex data envelopes, for example, by calculating data envelopes over fewer dimensions and by calculating several such data envelopes, instead. The manual selection of the control variables for the testing space requires a certain amount of experience because the selection of the control variables has an influence on the accuracy and reliability of the calibration.

The above problems do not only occur when calibrating an internal combustion engine as a technical system, but can naturally be transferred to any technical system, wherein the technical system is controlled due to a specification of control variables and assumes a specific state defined by state variables in dependence of the specification of the control variables. Another example is a transmission application with a transmission control unit (TCU) or a hybrid application with a hybrid control unit and/or a battery management system. Further examples are the air conditioning of a vehicle or an electronically controllable suspension. In principle, any mechatronic system can be calibrated as a technical system controlled by a control unit. When calibrating the technical system, the general objective is that of specifying the control variables in dependence of the state variables such that possibly no impermissible operating states occur and, at the same time, predetermined output variables of the technical system are optimized with regard to an optimization target. During calibration, data fields or data tables are usually generated, by means of which the technical system can be controlled. Said data fields or data tables are usually stored in a control unit of the technical system in order to be able to read out the control variables that are optimal for the respective operating state during operation. Typical examples of components of a vehicle that are controlled by associated control units are, in addition to the internal combustion engine, a transmission, a drive battery, brakes, a drive train, a wheel suspension, etc.

However, the calibration according to the invention can also be used to optimize the behavior of a vehicle or a component of a vehicle. The driving characteristics of a vehicle (e.g., noise, chassis, damping, switching behavior, steering, air conditioning, etc.) are frequently optimized with regard to desired characteristics through calibration. Examples include damping optimization, transmission optimization, clutch optimization or the tuning of a vehicle steering system. The control variables are therefore specific settings on the technical system, with which the technical system is operated. For example, the rigidity of a chassis can be optimized by varying the spring parameters (control variables) in chassis supports in order to influence or optimize specific output variables, such as driving dynamics or driving comfort. Another example is a hydrodynamic clutch, wherein the clutch filling process is optimized, or the tuning of the behavior or characteristics of a vehicle steering system.

However, the calibration is also not limited to components of a vehicle but can be used in general for any machine components as a technical system.

In particular, any component of a machine, e.g., of a vehicle, that can be influenced by control variables during operation (e.g., by controlling or by a specific setting) and that, with regard to a specific behavior, is supposed to be optimized in dependence of an operating state may be considered as a technical system for the calibration.

Therefore, a problem addressed by the present invention is that of providing a method for calibrating a technical system, which makes it possible, on the basis of valid data points, to easily and quickly take into account the observance of a data envelope.

SUMMARY OF THE INVENTION

This problem is solved with the features of independent claim 1. By dividing the calibration space into several smaller sub-calibration spaces, for which data envelopes are calculated, the calculation effort for determining the data envelopes can be significantly reduced. Therefore, instead of a data envelope of high dimension, data envelopes of smaller dimensions are used, which can be determined more quickly. By dividing in accordance to the invention, it is ensured that the calibration variables that have the greatest limiting influence are contained in a first sub-calibration space. The objective is that of defining the smallest (e.g., convex) space that envelops the data as the data envelope. The calibration variables that have the greatest limiting influence also lead to the smallest data envelope, which is why they are advantageously put into the first sub-calibration space. This also makes it possible to carry out the calibration with calibration spaces of high dimensions (>10) and with conventional envelope algorithms, particularly a convex envelope algorithm such as the QuickHull algorithm.

The effort for determining the further sub-calibration spaces can be reduced if at least one remaining e-dimensional relationship with calibration variables not selected for the first sub-calibration space is simply used as a further sub-calibration space and the e-dimensional data envelope of said e-dimensional relationship is checked as an auxiliary condition during calibration. The effort is further reduced quite considerably if all remaining e-dimensional relationships with calibration variables not selected for the first sub-calibration space are used as further sub-calibration spaces.

The calibration can easily be extended to external influences on the technical system if at least one external influence on the technical system is taken into account during the calibration and the calibration variables comprise the at least one external influence.

BRIEF DESCRIPTION OF THE DRAWINGS

In the following, the present invention shall be described in greater detail with reference to FIGS. 1 to 3, which show exemplary, schematic and non-limiting advantageous embodiments of the invention. In the drawings.

DETAILED DESCRIPTION

Figure 1:
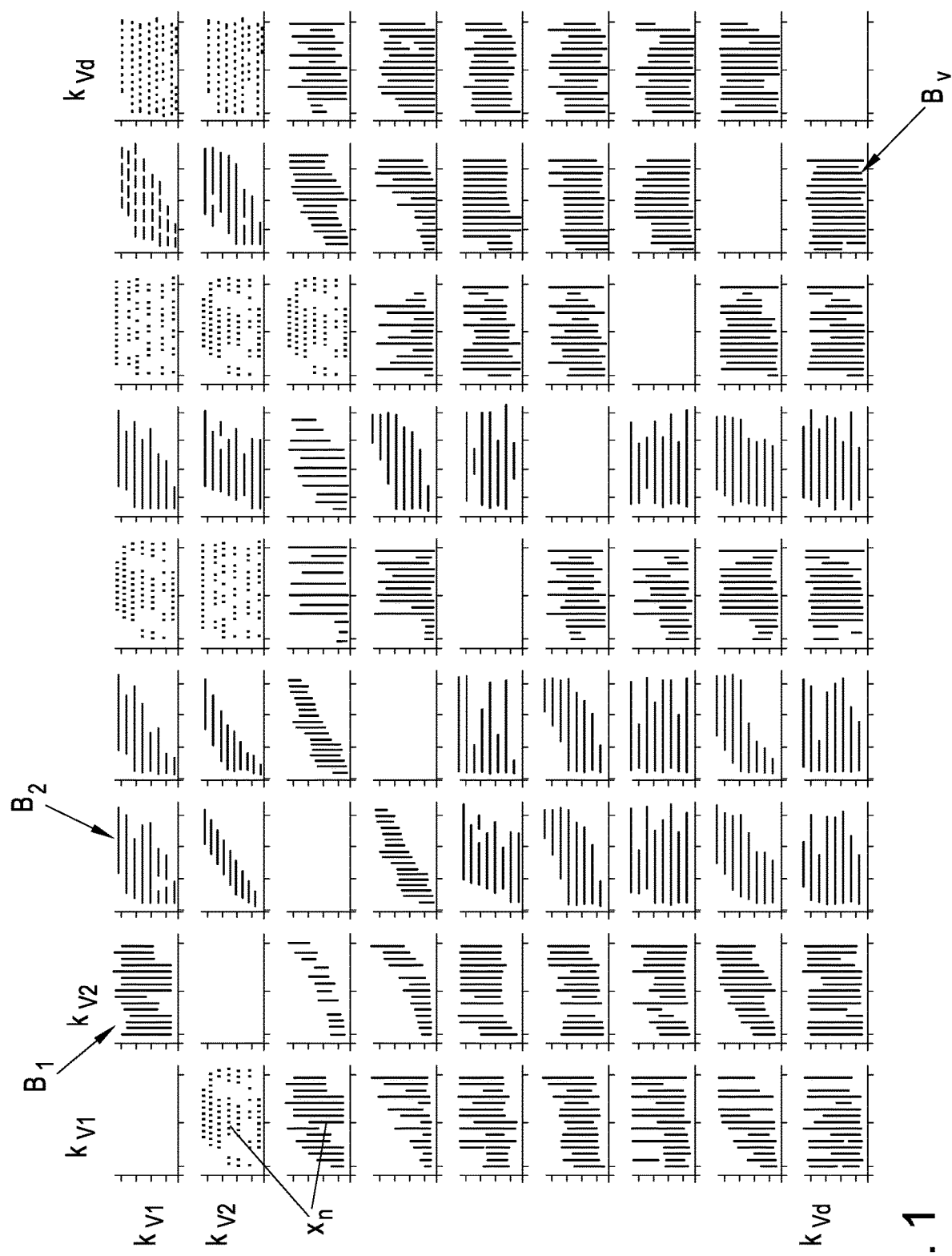
FIG. 1 shows the combinatorial variations of the calibration variables of the calibration space in the form of two-dimensional diagrams of the calibration variables.

It must first be noted that there are well-known methods for creating a test plan (also known as design of experiments (DoE)) in the form of a number of control variables, with which the technical system can be ideally stimulated in order to detect the static and dynamic properties of the technical system. If the technical system is stimulated with the control variables and the state variables are measured at the same time, data points $x_n$ are obtained, i.e., in this case concrete measurements on the technical system. There are also well-known methods for identifying a model of a technical system, or an output variable y of the technical system, on the basis of available data points $x_n$. Known, available models can also be used for technical systems. The output variable y no longer has to be measured with the model but can also be calculated from the model for other data points. A model can also be used to model the state variables in dependence of the control variables, which makes it possible to determine further data points $x_n$ with such a model. The test plan and a model are frequently also determined at the same time. Examples thereto can be found in WO 2012/169972 A1 or WO 2014/187828 A1. For the present invention, however, the concrete manner of obtaining the data points $x_n$ is not essential, but it is assumed that a multiplicity of valid data points $x_n$ (i.e., within the drivability limit) is available. It is also unimportant for the invention how the output variable y is determined, for example, by measurement on the technical system, or from a suitable model.

The invention shall now be described without loss of generality using the example of an internal combustion engine as a technical system. It is assumed that a multiplicity $n=1, \ldots, N$ of valid (i.e., within the drivability limit) data points $x_n$ of the technical system is available. The data points $x_n$ can be determined by measurement on a test stand for the technical system, for example, on an engine test bench for an internal combustion engine, or by means of an available or identified model of the technical system. In both cases, the objective of the calibration is usually that of covering with the data points $x_n$ the testing space, i.e., the space of the control variables $u_n$, in dependence of the state variables $v_n$ as well and as evenly as possible within the drivability limit.

In each case, a data point $x_n$ is a vector with all the calibration variables kv involved in the calibration in the form of concrete values of all k control variables $u=[u_1, \ldots, u_k]$ involved and of concrete values of all m state variables $v=[v_1, \ldots, v_m]$ involved, i.e., $x_n=[u_n^T, v_n^T]^T$. External influences w, which generally cannot be changed but are present and usually only change very slowly, could also be taken into account in the calibration variables kv. Such external influences w could also be set on a test stand for the technical system. A data point $x_n$ could therefore also contain such external influences w, which, however, does not change anything in the method according to the invention. For this purpose, the control variables $u_n$ and the state variables $v_n$ are possibly also combined in corresponding vectors.

The calibration is an optimization problem which, for example, can generally be put in the form $$u(v) = \operatorname*{argmin}_{u} y(x) \quad \forall\, v \in Z$$

$$h(x) \leq 0$$

$$g(x) \leq 0$$

Therein, Z denotes the state space given by the state variables v. h and g are specified auxiliary conditions of the optimization. Output variables y of the technical system are optimized which are combined in an output variable vector y, for example, emission values, consumption, etc. of an internal combustion engine. At least one output variable y is optimized in that the control variable vector u is varied in dependence of a given state variable vector v. With the auxiliary condition h, it is possible to specify, e.g., the observance of permissible operating states of the technical system, such as emission or consumption limits, a maximum cylinder pressure, a maximum engine temperature, avoidance of knocking, etc., and with the auxiliary condition g, a data envelope D, e.g., the observance of a drivability limit, can be specified. The output variable y can be measured on the technical system 1 or can be determined from a model of the technical system 1.

The calibration is usually carried out in a specified, fixed i-th, $i=1, \ldots, I$ operating point of the technical system, which is given by a specified i-th state variable vector $v_i$, which contains all state variables v. The calibration can also be carried out under certain external influences w.

The calibration at fixed operating points facilitates the calibration because the calibration variables kv can thus be reduced to the control variables u, and possibly to specific external influences w, thus, e.g., $x_i=[u]^T$. In the same way, the auxiliary conditions can also be simplified as $h_i(u_i)$ and $g_i(u_i)^+$. This is also referred to as a local calibration because only the control variables $u_i$ that apply to the respective i-th operating point are taken into account, but not the state variables $v_i$. This means also that only a local data envelope is taken into account. The local data envelope thus only comprises valid data points $x_{ni}$ for the fixed i-th operating point. The above optimization problem for the i-th operating point is then simplified to $$u_i = \underset{u}{\operatorname{argmin}}\ y(u)$$
$$h_i(u_i) \le 0$$
$$g_i(u_i) \le 0$$

This optimization problem is solved for at least one, preferably for each, of the i operating points. The known data points $x_n$ are only required during calibration for checking the data envelope in the form of the auxiliary condition $g_i(u_i)$. The disadvantage of local calibration is that it systematically ignores inherently known information about adjacent operating points.

Therefore, the state variables $v_i$ are frequently taken into account as an additional input in the calibration, and the calibration variables kv therefore comprise both the control variables u and the state variables v, and possibly also specific external influences, thus, e.g., $x_i=[u,v]^T$. The calibration can also be carried out under certain external influences. During the calibration, the control variable vector u is again varied in dependence of a given state variable vector $v_i$. In the same manner, the auxiliary conditions in the i-th operating point $v_i$ result as $h(u_i,v_i)$ and $g(u_i,v_i)$. This is also referred to as global calibration and with the auxiliary condition $g(u_i,v_i)$, a global data envelope over all data points $x_n$ is taken into account. The optimization problem then follows for each of the i operating points $v_i$ in the form $$u_i(v_i) = \underset{u}{\operatorname{argmin}}\ y(u, v_i)$$
$$h(u_i, v_i) \le 0$$
$$g(u_i, v_i) \le 0$$

This optimization problem is solved for at least one, preferably for all, i operating points. The calibration thus also takes place at a specific i-th operating point $v_i$ but information from further, particularly adjacent, operating points is now also taken into account via the auxiliary conditions h and g. This makes the models of the output variables y identified by the optimization more precise and the auxiliary condition g specified by the global data envelope less restrictive.

The output variables y for each of the i operating points of the technical system are in each case an optimization objective or an objective of the calibration, e.g., the minimization of emissions, such as an NOx, COx, HC, or soot emission of an internal combustion engine, the minimization of the consumption of an internal combustion engine, etc. The relationship between output variables y and the control variable u and possibly the state variable v is identified by the calibration. There are well-known methods for solving the above-mentioned optimization problems, for example, such methods are described in WO 2013/087307 A2. Therefore, during the optimization, the control variables u are sought which are optimal with regard to at least one output variable y of the technical system, wherein the optimization generally aims at minimizing or maximizing the output variable. In general, the optimization is carried out iteratively until a defined termination criterion is reached, e.g., a specific number of iterations or when a target specification of the output variables y is reached or undercut. The control variables u at the time when the termination criterion occurs are regarded as the optimal control variables u. The technical system is then operated with said optimal control variables. The observance of the auxiliary conditions is also checked in each iteration step. However, for the present invention, it is not essential as to how the optimization problem is specifically solved.

During the calibration, a new control variable vector $u_{ij}$ is determined for each of the i operating points $v_i$ through the optimization in each iteration step j of the optimization, taking into account the data envelope in the auxiliary condition g which is determined from the N available data points $x_n$. If the specified termination criterion is reached and the new control variable vector $u_{ij}$ fulfills all auxiliary conditions, the control variable vector becomes the optimized control variable $u_i$ in the i-th operating point in the last iteration step. In order to check the observance of the auxiliary condition g during calibration, it is checked in each iteration step j whether this new control variable vector lies within the data envelope, e.g., within the drivability limit, or outside. This check must also be possible sufficiently quickly for large dimensions (>10) of the calibration space K defined by the control variables u and possibly by the state variables V. Depending on the type of calibration (local or global), the calibration space K accordingly comprises the testing space (of the control variables) or the testing space (of the control variables) and the state space (of the state variables), possibly also taking into account external influences. In order to be able to check the auxiliary condition g during the optimization, the data envelope D must first be determined from the known N data points $x_n$. However, the dimension d of the calibration space K can become very large, so that the calculation of the data envelope D is sometimes very calculation-intensive or cannot be calculated at all (at least not in a reasonable time).

Figure 4:
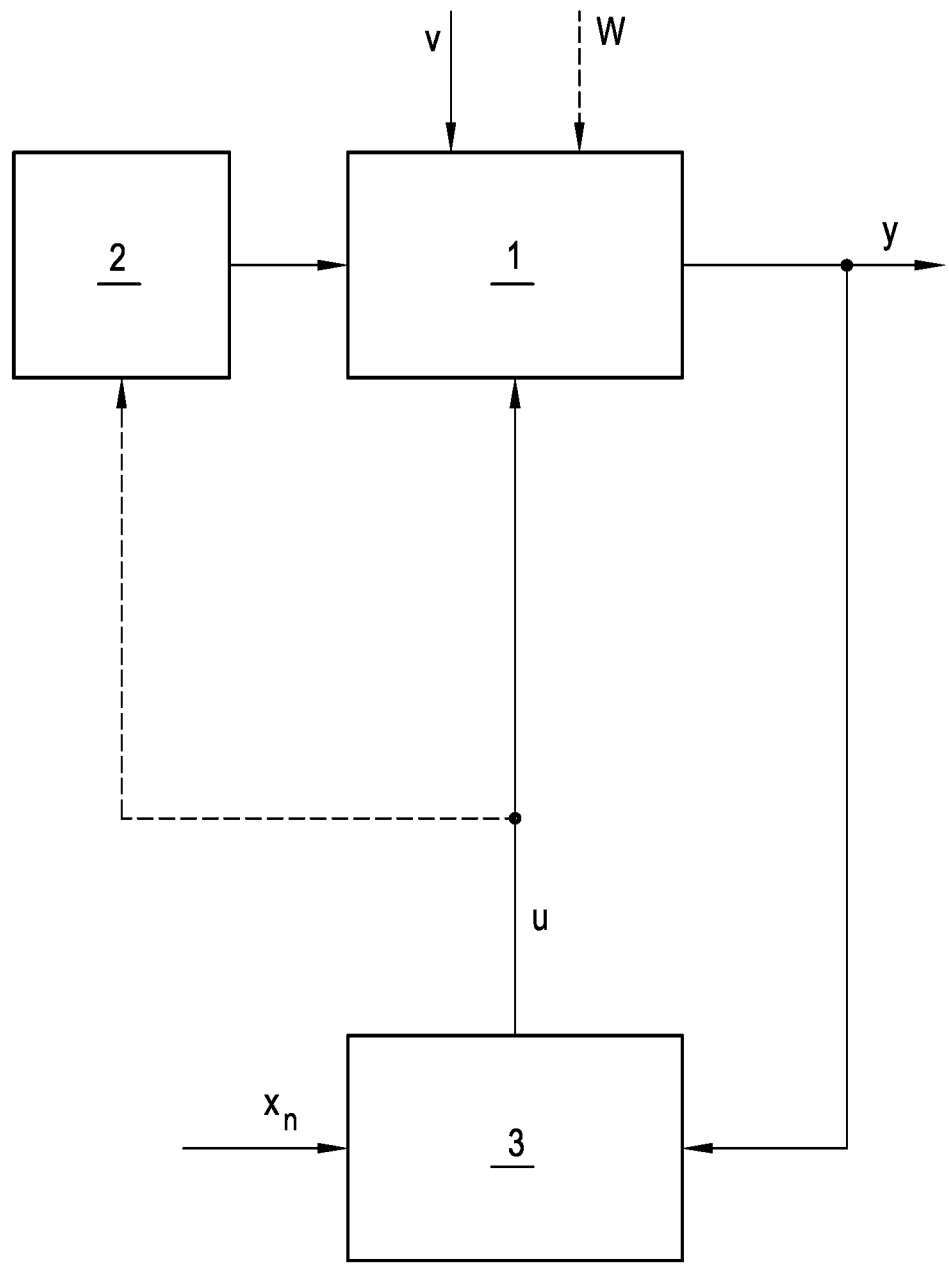
FIG. 4 shows an example of a calibration of a technical system.

The calibration could proceed as shown in FIG. 4. The calibration takes place in a calibration unit 3 (the hardware and/or software used for the calibration) on the basis of known data points $x_n$, in that the control variables u of the technical system 1 are varied with given state variables v and possibly given external influences w in order to optimize the at least one output variable y. For this purpose, it is not essential whether the technical system 1 is actually available as hardware or is simulated by a model. If a model is used for the technical system 1, the model can also be implemented in the calibration unit 3. The calculation of the data envelope D, as described below, can also take place in the calibration unit 3. The control variables u determined in the calibration, which optimize the output variable, can then be stored in a control unit 2, with which the technical system 1 is controlled (as indicated in FIG. 4) or the technical system 1 can be adjusted with said control variables u.

According to the invention, for the calculation of the data envelope D, the entire calibration space K with dimension d is first divided into a first sub-calibration space $K_{sub}$ and a number of further sub-calibration spaces $K_{sub2}$. In this case, of course, the sub-calibration spaces $K_{sub}$, $K_{sub2}$ should preferably not overlap. The dimension d is the number of control variables $u=[u_1, \ldots, u_k]$ and state variables $v=[v_1, \ldots, v_m]$ that are used in the calibration, i.e., d=k+m. If external influences are also taken into account, the dimension d increases accordingly. For simplification, reference shall in the following only be made to calibration variables $kv_1, \ldots, kv_d$ which comprise the control variables and the state variables used for the calibration, and optionally external influences. According to the invention, the maximum dimension $d_{sub}$ of the first sub-calibration space $K_{sub}$ is determined or specified first, with $d_{sub}<d$. The maximum dimension $d_{sub}$ is naturally selected such that a data envelope $D_{sub}$ for this first sub-calibration space $K_{sub}$ can be calculated sufficiently quickly with the selected envelope algorithm. When using the QuickHull algorithm or another algorithm for calculating a convex data envelope, the maximum dimension $d_{sub}$ is specified, for example, with 4 to 7, wherein another maximum dimension $d_{sub}$ can naturally also be selected. In the case of other algorithms, the maximum dimension $d_{sub}$ can optionally also be selected to be larger. The further sub-calibration spaces $K_{sub2}$ can have the same maximum dimension $d_{sub2}=d_{sub}$ but can also have smaller dimension $d_{sub2}$, wherein the dimensions of the individual further sub-calibration spaces $K_{sub2}$ (if there are several) do not have to be identical. In order to divide the original dimension d of the calibration space K of the calibration into several smaller sub-calibration spaces $K_{sub}$, $K_{sub2}$, specific calibration variables kv of the calibration space K of the calibration must naturally be selected and assigned to the sub-calibration spaces $K_{sub}$, $K_{sub2}$.

For this purpose, subsets with a number of e elements each, i.e., subsets of the calibration variables $kv_1, \ldots, Kv_d$ of the size e, are formed through combinatorial variations for the number d of the calibration variables $kv_1, \ldots, Kv_d$ of the calibration space K. The fewer elements e there are in the subsets, the faster the sub-calibration spaces $K_{sub}$, $K_{sub2}$ can be determined, which is why small sets, particularly sets with e=2 elements, are preferred. The number e of the elements is naturally smaller than the number d of the calibration variables $kv_1, \ldots, Kv_d$. The combinatorial variations can be formed without taking into account the sequence of the elements in the subsets (e.g., {a, b}={b, a}) or by taking into account the sequence of the elements in the subsets (e.g., {a, b}≠{b, a}). If all such variations for a selection of e elements are formed from a set with d elements, either $$\binom{d}{e} = \frac{d!}{(d-e)!}$$

variations taking into account the sequence or $$\binom{d}{e} = \frac{d!}{(d-e)!\,e!}$$

variations without taking into account the sequence are obtained. For the entire calibration space K with dimension d, there are therefore a number of e-dimensional relationships, in each of which the number e of the calibration variables $kv_1, \ldots, kv_d$ are contained. The number of e-dimensional relationships corresponds to the number of possible combinatorial variations. In the case of e=2 or e=3, these relationships can also be represented in the form of two-dimensional or three-dimensional diagrams $B_v$. The known data points $x_n$, which are used to determine the data envelopes, are plotted in these two-dimensional or three-dimensional diagrams By.

In the embodiment according to FIG. 1, a calibration space K with dimension d=9 is assumed, i.e., that the calibration space K contains, e.g., a total of nine control variables and state variables. In the example according to FIG. 1, for example, m=2 state variables $v_1$ (=$kv_1$), $v_2$ (=$kv_2$) of the technical system, in this case, e.g., an engine speed and an engine torque. In addition, there are k=7 control variables $u_1$ (=$kv_3$), ..., $u_7$ (=$kv_d$) of the technical system, wherein it is not important which variables they are, specifically. From this, subsets with e=2 elements each are formed, resulting in V=72 variations (taking the sequence into account) of the calibration variables $kv_1, \ldots, kv_d$ and V=72 two-dimensional diagrams as relationships $B_v$. By way of illustration, these variations are shown in FIG. 1 in matrix form. If the sequence were not taken into account, V=36 variations would be obtained, which could be represented either in the form of the upper or lower triangular matrix in FIG. 1.

The axes of the individual two-dimensional relationships $B_v$ are preferably normalized, i.e., the abscissa values of the individual two-dimensional relationships $B_v$ are brought to the same axis lengths. The same is preferably applied to the ordinate values, wherein the axis lengths of the abscissas and ordinates do not have to be identical. The step of normalizing is not absolutely necessary, but it is advantageous because it usually leads to better results.

For the two-dimensional relationships $B_v$, it results in rectangular grids with the same side lengths (the axis lengths of the abscissas and ordinates) as shown in FIG. 1. This step can naturally also be carried out for higher-dimensional relationships $B_v$.

Figure 2:
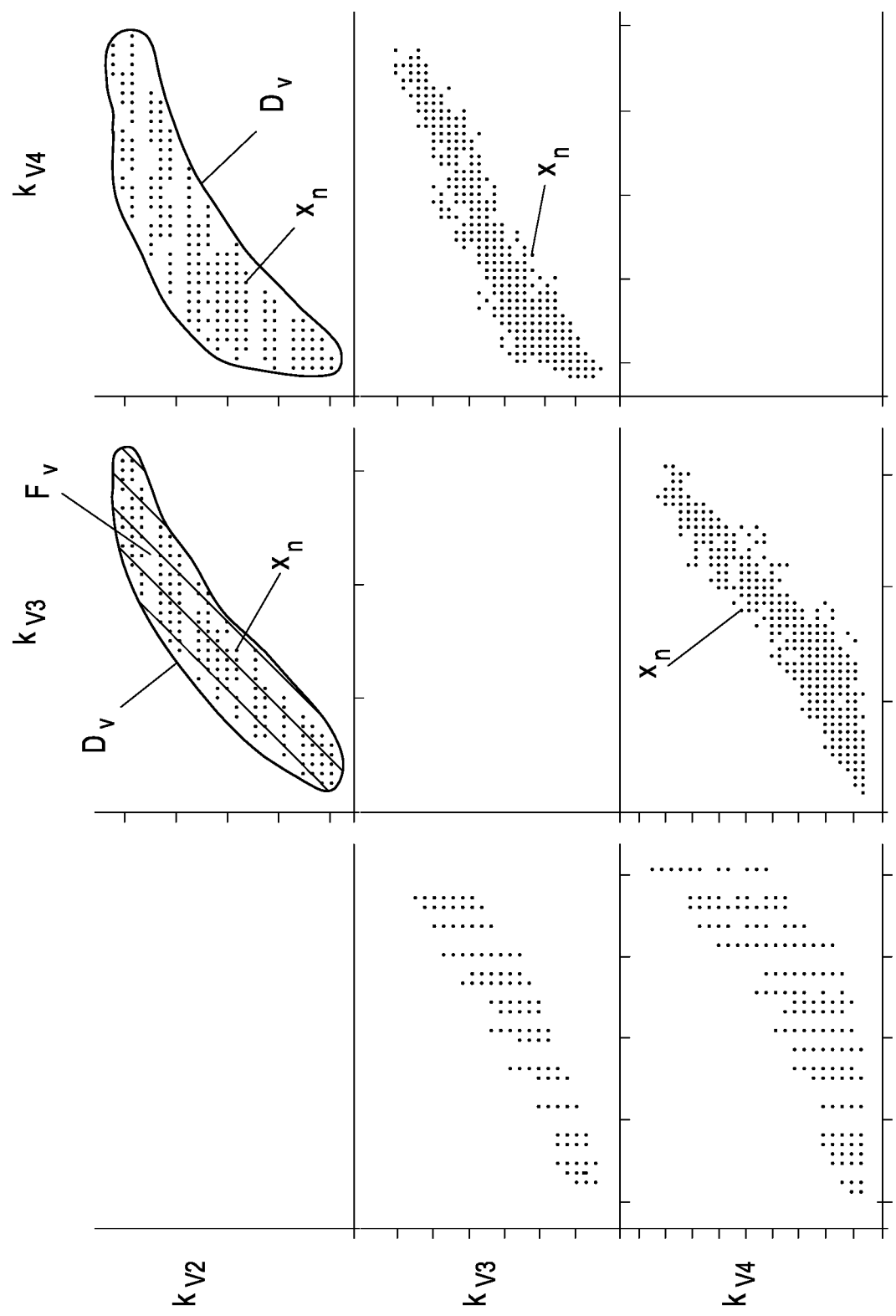
FIGS. 2 and 3 each show an excerpt thereof with two-dimensional data envelopes.

A data envelope $D_v$, for example, a convex data envelope $D_v$, is now calculated, for example, with the QuickHull algorithm, for each two-dimensional relationship $B_v$, or in general for each e-dimensional relationship. Since the dimension of the relationships $B_v$ is preferably two, or is generally selected to be sufficiently small, such data envelopes $D_v$ can be calculated very quickly. The data envelopes $D_v$ are shown in FIG. 2 for some diagrams.

Figure 3:
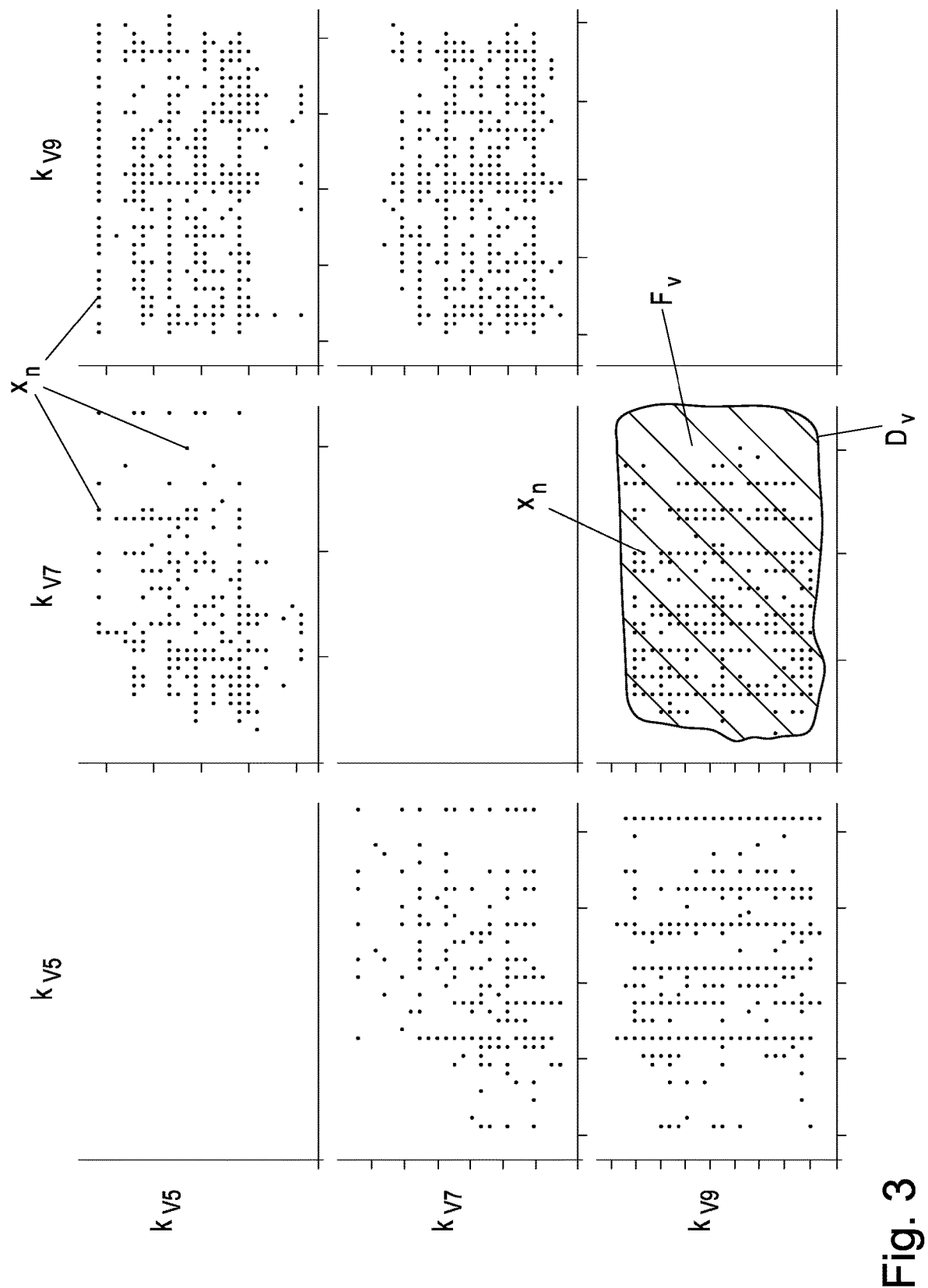

Next, the volume contents $F_v$ of the calculated data envelopes $D_v$ are determined. In the case of two-dimensional data envelopes $D_v$, the volumes are naturally reduced to surface areas. Such volume contents $F_v$ can be determined numerically very easily with the known data envelopes $D_v$. In FIGS. 2 and 3, a few two-dimensional diagrams $B_v$ for specific calibration variables kv, as well as the associated data envelopes $D_v$ and the volume contents $F_v$ (herein as surface areas) are shown by way of illustration. The smaller the volume content $F_v$ of such an e-dimensional data envelope $D_v$, the more the calibration variables kv contained in the e-dimensional relationship $B_v$ limit the data envelope D of the underlying calibration space K. Equivalently, the volume content could naturally also be calculated outside the data envelope $D_v$. In this case, it would apply that the greater said volume, the greater the limiting influence on the data envelope of the underlying testing space. In the same way, the ratio or the difference between the volume outside the data envelope $D_v$ and the volume content $F_v$ of the data envelope $D_v$ (or vice versa) could be used for the assessment. A ratio of the volume content $F_v$ of a data envelope, or the volume outside the data envelope $D_v$, and the volume of the e-dimensional space spanned in the relationship $B_v$ could also be used. However, this all amounts to the evaluation of the volume content $F_v$ of the data envelopes $D_v$, and the smaller said volume content $F_v$, the higher the rating of the limiting effect of the calibration variables kv involved in an e-dimensional diagram By.

Accordingly, the $d_{sub}$ calibration variables kv, which are involved in the data envelopes $D_v$ in the e-dimensional relationships $B_v$ with the smallest volume contents $F_v$, are selected for the first sub-calibration space $K_{sub}$.

For this purpose, for example, the e-dimensional relationship $B_v$ with the smallest volume content $F_v$ can be selected and the calibration variables kv involved can be added to the $d_{sub}$ calibration variables kv. Subsequently, the relationship $B_v$ with the second smallest volume content $F_v$ is selected and the two calibration variables kv involved are added again to the $d_{sub}$ calibration variables kv. If one of the calibration variables kv involved is already included in the set of selected calibration variables kv, it is naturally not added again. This is repeated until all $d_{sub}$ calibration variables kv have been selected. This selection thus only determines which of the d calibration variables kv of the calibration space K are used in the first sub-calibration space $K_{sub}$ with the dimension $d_{sub}$.

If not all of the calibration variables kv involved in a relationship $B_v$ can be added in a last step because only a smaller number of calibration variables kv to be selected is missing, then, for example, the required number of calibration variables kv involved can simply be selected as desired. For example, in the two-dimensional case, always the calibration variables kv of the abscissa or the ordinate are selected. However, said relationship $B_v$ could also be skipped and the relationship $B_v$ with the next largest data envelope $D_v$ could be selected as long as a relationship $B_v$ is found, in which only the required number of calibration variables kv is involved which is not yet contained in the set of $d_{sub}$ selected calibration variables kv. However, any other strategy for selecting the missing calibration variables kv can also be implemented.

Any data envelope $D_{sub}$ can then be calculated for the thus determined sub-calibration space with dimension $d_{sub}<d$ with the known data points $x_n$ which are naturally reduced to the $d_{sub}$ selected calibration variables kv. Since the dimension $d_{sub}$ is sufficiently low, this can also be done sufficiently quickly with conventional envelope algorithms, such as the QuickHull algorithm.

Different approaches can be used for the remaining ($d-d_{sub}$) calibration variables kv of the calibration space K, which have to be divided into the further sub-calibration spaces $K_{sub2}$.

One option is that of again selecting with the above method $d_{sub2}$ calibration variables kv from the remaining ($d-d_{sub}$) calibration variables kv, wherein the dimension $d_{sub2}$ can once again be determined or specified, in order to determine a sub-calibration space $K_{sub2}$. This can naturally also be applied to several further sub-calibration spaces $K_{sub2}$. Corresponding data envelopes $D_{sub2}$ can thus also be calculated for said sub-calibration spaces. However, the already determined data envelopes $D_v$ of the e-dimensional diagrams $B_v$ could simply also be used for the remaining ($d-d_{sub}$) calibration variables kv, which represents a particularly quick method. A further option consists in simply manually dividing the remaining ($d-d_{sub}$) calibration variables kv into further sub-calibration spaces $K_{sub2}$ because the calibration variables kv with the most limiting effect are already contained in the first sub-calibration space $K_{sub}$. A combination of these options is also conceivable.

However, for the remaining ($d-d_{sub}$) calibration variables kv, the method described in WO 2017/198638 A1 could also be used for the calibration. This can naturally also be combined with the other options.

The assignment of the $d_{sub}$ calibration variables kv with the most limiting effect to the first sub-calibration space $K_{sub}$, which can take place systematically and automatically with the method according to the invention, is advantageous for the invention.

For the calibration, several data envelopes $D_{sub}$, $D_{sub2}$, $D_v$ of smaller dimensions must be checked in the auxiliary conditions g instead of a single data envelope D with a high dimension d, but this does not change the basic approach for the calibration.

The invention claimed is:

1. A method for calibrating a technical system, wherein the technical system is at least one of an internal combustion engine, a transmission, a hybrid drive, an air conditioning of a vehicle, an electronically controllable suspension, or a vehicle steering system, the method including the following steps:
   controlling the technical system using a number k of control variables ($u_k$),
   in dependence of values of the control variables ($u_k$), an operating point results in the form of values of a number m of state variables ($v_m$) of the technical system,
   during a calibration, the values of control variables ($u_k$) of the technical system, that are optimal with regard to at least one output variable (y) of the technical system, are determined in the operating point by optimization while observing specified auxiliary conditions (h, g)), such that the technical system is optimized,
   wherein with an auxiliary condition (g) of the optimization it is checked whether new values of the control variables (u) of the technical system calculated during the optimization lie within a data envelope D around a number of existing data points ($x_n$) of the technical system,
   characterized in that a d-dimensional calibration space K, which includes calibration variables k, required for the calibration, whereas the calibration variables comprise the control variables of the technical system and the state variables of the technical system, is divided into a first sub-calibration space $K_{sub}$ with a dimension $d_{sub}<d$ and at least one further sub-calibration space $K_{sub2}$, in that
   subsets with a number e of calibration variables $k_v$ are determined through combinatorial variations and from the resulting e-dimensional relationships $B_v$ of the calibration variables $k_v$ and by means of the existing data points ($x_n$) of the technical system, an e-dimensional data envelope $D_v$ is calculated for each e-dimensional relationship $B_v$,
   the volume content $F_v$ of the e-dimensional data envelope $D_v$ is checked for each e-dimensional data envelope $D_v$,
   the $d_{sub}$ calibration variables $k_v$, which are assigned to the e-dimensional data envelopes $D_v$ with the smallest volume contents $F_v$, are selected for the first sub-calibration space $K_{sub}$,
   the remaining $d-d_{sub}$ calibration variables $k_v$ are assigned to the at least one further sub-calibration space $K_{sub2}$ or are divided into several further sub-calibration spaces $K_{sub2}$, and
   a $d_{sub}$-dimensional data envelope $D_{sub}$ is calculated using the existing data points ($x_n$) of the technical system at least for the first sub-calibration space $K_{sub}$ and is checked during the calibration as an auxiliary condition g.

2. The method according to claim 1, characterized in that at least one remaining e-dimensional relationship $B_v$ with calibration variables $k_v$ not selected for the first sub-calibration space $K_{sub}$ is used as a further sub-calibration space $K_{sub2}$ and the e-dimensional data envelope $D_V$ of said e-dimensional relationship $B_v$ is additionally checked as an auxiliary condition g during calibration.

3. The method according to claim 1, characterized in that all remaining e-dimensional relationships $B_v$ with calibration variables $k_v$ not selected for the first sub-calibration space $K_{sub}$ are used as the further sub-calibration spaces $K_{sub2}$ and the e-dimensional data envelopes $D_v$ of said e-dimensional relationships $B_v$ are checked as additional auxiliary conditions g during calibration.

4. The method according to claim 1, characterized in that at least one external influence on the technical system is taken into account during the calibration and the calibration variables $k_v$ include the at least one external influence.

5. The method of claim 1, wherein the subsets with a number e=2.

6. A method for calibrating a technical system, wherein the technical system is at least one of a drive battery, a brake, or a drive train, the method including the following steps:
   controlling the technical system using a number k of control variables ($u_k$),
   in dependence of values of the control variables ($u_k$), an operating point results in the form of values of a number m of state variables ($v_m$) of the technical system,
   during a calibration, the values of control variables ($u_k$) of the technical system, that are optimal with regard to at least one output variable (y) of the technical system, are determined in the operating point by optimization while observing specified auxiliary conditions (h, g)), such that the technical system is optimized,
   wherein with an auxiliary condition (g) of the optimization it is checked whether new values of the control variables (u) of the technical system calculated during the optimization lie within a data envelope D around a number of existing data points (xi) of the technical system,
   characterized in that a d-dimensional calibration space K, which includes calibration variables $k_v$ required for the calibration, whereas the calibration variables comprise the control variables of the technical system and the state variables of the technical system, is divided into a first sub-calibration space $K_{sub}$ with a dimension $d_{sub}<d$ and at least one further sub-calibration space $K_{sub2}$, in that
      subsets with a number e of calibration variables $k_v$ are determined through combinatorial variations and from the resulting e-dimensional relationships $B_v$ of the calibration variables $k_v$ and by means of the existing data points ($x_n$) of the technical system, an e-dimensional data envelope $D_v$ is calculated for each e-dimensional relationship $B_v$,
      the volume content $F_v$ of the e-dimensional data envelope $D_v$ is checked for each e-dimensional data envelope $D_v$,
      the $d_{sub}$ calibration variables $k_v$, which are assigned to the e-dimensional data envelopes $D_v$ with the smallest volume contents $F_v$, are selected for the first sub-calibration space $K_{sub}$,
      the remaining $d-d_{sub}$ calibration variables $k_v$ are assigned to the at least one further sub-calibration space $K_{sub2}$ or are divided into several further sub-calibration spaces $K_{sub2}$, and
      a $d_{sub}$-dimensional data envelope $D_{sub}$ is calculated using the existing data points ($x_n$) of the technical system at least for the first sub-calibration space $K_{sub}$ and is checked during the calibration as an auxiliary condition g.

7. A method for calibrating a technical system, wherein the technical system is a chassis, the method including the following steps:
   controlling the technical system using a number k of control variables ($u_k$),
   in dependence of values of the control variables ($u_k$), an operating point results in the form of values of a number m of state variables ($v_m$) of the technical system,
   during a calibration, the values of control variables ($u_k$) of the technical system, that are optimal with regard to at least one output variable (y) of the technical system, are determined in the operating point by optimization while observing specified auxiliary conditions (h, g)), such that the technical system is optimized,
   wherein with an auxiliary condition (g) of the optimization it is checked whether new values of the control variables (u) of the technical system calculated during the optimization lie within a data envelope D around a number of existing data points ($x_n$) of the technical system,
   characterized in that a d-dimensional calibration space K, which includes calibration variables $k_v$ required for the calibration, whereas the calibration variables comprise the control variables of the technical system and the state variables of the technical system, is divided into a first sub-calibration space $K_{sub}$ with a dimension $d_{sub}<d$ and at least one further sub-calibration space $K_{sub2}$, in that
      subsets with a number e of calibration variables $k_v$ are determined through combinatorial variations and from the resulting e-dimensional relationships $B_v$ of the calibration variables $k_v$ and by means of the existing data points ($x_n$) of the technical system, an e-dimensional data envelope $D_v$ is calculated for each e-dimensional relationship $B_v$,
      the volume content $F_v$ of the e-dimensional data envelope $D_v$ is checked for each e-dimensional data envelope $D_v$,
      the $d_{sub}$ calibration variables $k_v$, which are assigned to the e-dimensional data envelopes $D_v$ with the smallest volume contents $F_v$, are selected for the first sub-calibration space $K_{sub}$,
      the remaining $d-d_{sub}$ calibration variables $k_v$ are assigned to the at least one further sub-calibration space $K_{sub2}$ or are divided into several further sub-calibration spaces $K_{sub2}$, and
      a $d_{sub}$-dimensional data envelope $D_{sub}$ is calculated using the existing data points ($x_n$) of the technical system at least for the first sub-calibration space $K_{sub}$ and is checked during the calibration as an auxiliary condition g.

* * * * *